United States Patent
Hannu et al.

(10) Patent No.: US 10,798,607 B2
(45) Date of Patent: Oct. 6, 2020

(54) ENABLING EFFICIENT HANDLING OF REDUNDANT PACKET COPIES IN A WIRELESS COMMUNICATION SYSTEM

(71) Applicant: Telefonaktiebolaget LM Ericsson (publ), Stockholm (SE)

(72) Inventors: Hans Hannu, Luleå (SE); Jan Christoffersson, Luleå (SE); Mårten Ericson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 16/309,185

(22) PCT Filed: Jul. 5, 2017

(86) PCT No.: PCT/SE2017/050751
§ 371 (c)(1),
(2) Date: Dec. 12, 2018

(87) PCT Pub. No.: WO2019/009772
PCT Pub. Date: Jan. 10, 2019

(65) Prior Publication Data
US 2020/0084661 A1    Mar. 12, 2020

(51) Int. Cl.
*H04W 28/06* (2009.01)
*H04W 76/16* (2018.01)
(Continued)

(52) U.S. Cl.
CPC .......... *H04W 28/06* (2013.01); *H04W 76/16* (2018.02); *H04W 80/02* (2013.01); *H04W 80/08* (2013.01); *H04W 76/15* (2018.02)

(58) Field of Classification Search
CPC ....... H04L 1/08; H04L 1/1816; H04L 1/1858; H04L 1/1874; H04L 1/189; H04L 5/0035;
(Continued)

(56) References Cited

U.S. PATENT DOCUMENTS

2011/0113299 A1  5/2011  Power et al.
2015/0095453 A1  4/2015  Jain et al.
(Continued)

FOREIGN PATENT DOCUMENTS

WO    2018200565 A1    11/2018

OTHER PUBLICATIONS

"Response to LS on uplink transmission gap in NB-IoT", 3GPP TSG RAN WG2 Meeting #94; R2-163339; Nanjing, China, May 23-27, 2016, p. 1.
(Continued)

*Primary Examiner* — Pao Sinkantarakorn
(74) *Attorney, Agent, or Firm* — Murphy, Bilak & Homiller, PLLC

(57) ABSTRACT

There is provided a method of operating a wireless communication device adapted for multi-connectivity to enable individual connections to at least two different network units. The method comprises receiving (S1) information indicating packets received by one of the network units from the wireless communication device over one of the connections, and removing (S2) redundant packets for another one of the connections corresponding to the indicated packets.

23 Claims, 16 Drawing Sheets

(51) Int. Cl.
*H04W 80/02* (2009.01)
*H04W 80/08* (2009.01)
*H04W 76/15* (2018.01)

(58) Field of Classification Search
CPC .... H04L 69/323; H04L 69/324; H04W 28/04; H04W 36/0069; H04W 76/15; H04W 80/02
See application file for complete search history.

(56) References Cited

U.S. PATENT DOCUMENTS

| | | |
|---|---|---|
| 2015/0281288 A1 | 10/2015 | Levinson et al. |
| 2016/0219024 A1 | 7/2016 | Verzun et al. |
| 2016/0242080 A1 | 8/2016 | Vikberg et al. |
| 2018/0287748 A1* | 10/2018 | Kim .................. H04L 47/30 |
| 2018/0309660 A1* | 10/2018 | Loehr ................ H04L 1/08 |

OTHER PUBLICATIONS

Unknown, Author, "Dual Connectivity based link switch between LTE and NR", 3GPP TSG-RAN WG2 #95, Tdoc R2-165330, Gothenburg, Sweden, Aug. 22-26, 2016, pp. 1-3.

Unknown, Author, "Tight integration of NR and LTE: User Plane design", 3GPP TSG-RAN WG2 #94, Tdoc R2-164027, Nanjing, P.R. China, May 23-27, 2016, pp. 1-4.

"Duplication Impacts to PDCP", 3GPP TSG-RAN WG2 #97bis; R2-1702642; Spokane, USA, Apr. 3-7, 2017, pp. 1-5.

"Packet duplication in CA", 3GPP TSG-RAN WG2 #97bis; R2-1705240; Spokane, USA, Apr. 3-7, 2017, pp. 1-3.

"Further aspects of data duplication in PDCP layer", 3GPP TSG-RAN WG2 #97, R2-1700834, Athens, Greece, Feb. 13-17, 2017, pp. 1-3.

* cited by examiner

ENABLING EFFICIENT HANDLING OF REDUNDANT PACKET COPIES IN A WIRELESS COMMUNICATION SYSTEM

TECHNICAL FIELD

The proposed technology generally relates to dual connectivity, or more generally multi-connectivity, in wireless communication systems, and more specifically to a method of operating a wireless communication device and a corresponding wireless communication device, computer program and computer-program product as well as a corresponding apparatus for handling redundant packet copies for a wireless communication device adapted for multi-connectivity and having individual connections to at least two different network units.

BACKGROUND

New evolved wireless communication systems are constantly being developed. By way of example, so-called fifth generation, 5G, systems are currently being discussed, developed and/or deployed. 5G, also referred to as New Radio, NR, is currently viewed primarily as a change to the radio specifications, although other aspects may be concerned.

5G, as an illustrative example, is expected to operate in a wide range of frequency bands, probably using also very high frequency bands compared to 4G. This implies, for example, lower diffraction and higher outdoor-to-indoor penetration losses, which means that signals will have more difficulties to propagate around corners and penetrate walls. Also, the initial deployment of 5G will be rather spotty.

The state-of-the-art integration between two different Radio Access Technologies, RATs, is normally based on so-called hard handover. The major drawbacks with inter-RAT hard handover, e.g. between 3G and 4G, are the rather long delay and service interruption as well as the low reliability. A tighter integration with evolved LTE may therefore be crucial in order to ensure ultra-high reliability and extreme bit rates in a 5G system. This may also hold true for other RATs.

A plausible alternative is to use a solution based on Multi-Connectivity, MC, or Dual Connectivity, DC. In general, MC, of which DC is a special case, implies the possibility of multiple (dual) connections that are maintained in parallel. Usually, but not limited thereto, the parallel connections are based on different RATs. It is also possible to provide Multi Connectivity based on one and the same RAT.

FIG. 1 is a schematic diagram illustrating an example of the general principles of Multi/Dual Connectivity in a wireless communication system. In this example, the wireless communication system comprises a wireless communication device 100 having connections to at least two network units 10 including at least a first network unit 10-1 and a second network unit 10-2. The wireless communication device 100 has a first connection to the first network unit 10-1, and a second connection to the second network unit 10-2.

FIG. 2 is a schematic diagram illustrating an example of a Multi/Dual Connectivity system based on two or more radio units 10-1, 10-2 being simultaneously connected to a wireless device 100. The radio units may be connected to or at least partly implemented in a central unit 20.

For example, in 5G DC, both User Plane, UP, and Control Plane, CP, are normally connected to both LTE and 5G and the UP data is aggregated (or split) at the Packet Data Convergence Protocol, PDCP, layer. Typically, this means that the so-called "bearer split" option (also called 3C) is employed, i.e. the bearer is split in the master eNB at the PDCP layer. Dual connectivity increases the user throughput (due to UP aggregation), especially at low load and increases the reliability (due to CP diversity).

However, MC or DC does not increase the coverage of the user plane data like solutions such as Coordinated Multi Point, CoMP, soft handover and multi-flow. All these solutions transmit the same UP data over all links and thereby increases the coverage. CoMP and Soft handover rely on a synchronized transmission (and reception) and maximum ratio combining (MRC) of the signals (i.e. combing of the symbols). However, for LTE and 5G (NR) this can be very difficult due to different transport formats, pilots, waveforms, numerology etc. Also, both CoMP and soft handover requires very good backhaul (X2) and quite synchronized networks. Therefore, solutions like HSPA multi-flow may be a solution for LTE-5G tight integration, as well as NR-NR multi-connectivity, enabling coverage extension due to selection ratio combing (SRC). This is not as good as CoMP/Soft handover which enables MRC but can still give large benefits especially in situations with very fast and varying channels.

A main problem with Multi Connectivity in general, and LTE-5G dual connectivity in particular, is that it does not by itself increase the coverage of the user plane data. One option is to multiplicate/duplicate the packets, i.e. transmit the same packets over two or more connections, or more generally transmit packets comprising the same information over two or more connections.

By way of example, for LTE-5G, the same PDCP packets may be transmitted in both connections/links/RATs.

Another problem with multiplicated/duplicated transmissions is that it may waste resources if one link is slower than the other. If for example NR and LTE are used, then the NR link (when in good coverage) may have a bitrate far exceeding that of LTE. This means that LTE may fall behind and transmit RLC PDUs which were already transmitted by NR several TTIs ago. In this case, the duplicated transmissions will eventually be so late, that they are more or less useless. This problem is illustrated in FIG. 3 where different RLC packets are transmitted in the first TTI and already in the second TTI the slow link is transmitting RLC PDUs which were transmitted by the fast link in the first TTI. If this would be continued for a number of TTIs, it is easy to see that the slower link is useless and that PDCP duplication in similar situations will be very resource consuming with very little benefits.

SUMMARY

It is an object to enable efficient handling of redundant packet copies in a wireless communication system operating based on multi/dual connectivity and/or a system for packet multiplication/duplication.

It is a specific object to provide a method of operating a wireless communication device adapted for multi-connectivity to enable individual connections to at least two different network units.

Another object is to provide a wireless communication device configured for multi-connectivity to enable individual connections to at least two different network units.

Yet another object is to provide a computer program for operating, when executed by a processor, a wireless communication device, and a corresponding computer-program product.

It is also an object to provide an apparatus for operating a wireless communication device adapted for multi-connectivity to enable individual connections to at least two different network units.

These and other objects are met by embodiments of the proposed technology.

According to a first aspect, there is provided a method of operating a wireless communication device adapted for multi-connectivity to enable individual connections to at least two different network units. The method comprises:

receiving information indicating packets received by one of the network units from the wireless communication device over one of the connections; and removing redundant packets for another one of the connections corresponding to the indicated packets.

In a sense, the proposed technology can be regarded as a way of enabling efficient removal of redundant packet copies in a wireless communication device adapted for multi-connectivity.

According to a second aspect, there is provided a wireless communication device configured for multi-connectivity to enable individual connections to at least two different network units. The wireless device is configured to receive information indicating packets received by one of the network units from the wireless communication device over one of the connections. The wireless communication device is also configured to remove redundant packets for another one of the connections corresponding to the indicated packets According to a third aspect, there is provided a computer program for operating, when executed by a processor, a wireless communication device adapted for multi-connectivity to enable individual connections to at least two different network units. The computer program comprises instructions, which when executed by the processor, cause the processor to:

receive information indicating packets received by one of the network units from the wireless communication device over one of the connections; and remove redundant packets for another one of the connections corresponding to the indicated packets.

According to a fourth aspect, there is provided a computer program product comprising a computer-readable medium carrying a computer program according to the third aspect.

According to a fifth aspect, there is provided an apparatus for handling redundant packet copies for a wireless communication device adapted for multi-connectivity and having individual connections to at least two different network units. The apparatus comprises an input module for receiving information indicating packets received by one of the network units from the wireless communication device over one of the connections. The apparatus also comprises a packet removal module for removing redundant packets for another one of the connections corresponding to the indicated packets.

In this way, efficient removal of redundant packet copies is enabled and/or effectuated, resulting in reduced transmissions and/or improved user and system performance in terms of throughput and/or latency.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

In the following, the general non-limiting term "network unit" may refer to any network unit suitable for operation in connection with a wireless communication system, including but not limited to network devices and network nodes.

As used herein, the term "network device" may refer to any device located in connection with a communication network, including but not limited to devices in access networks, core networks and similar network structures. The term network device may also encompass computer-based network devices such as cloud-based network devices for implementation in cloud-based environments.

As used herein, the non-limiting term "network node" may refer to base stations, access points, radio units, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

For a better understanding of the proposed technology, it may be useful to begin with a brief system overview with reference once again to FIG. 1 and FIG. 2, illustrating some of the general principles of Multi/Dual Connectivity in a wireless communication system.

Figure 1:
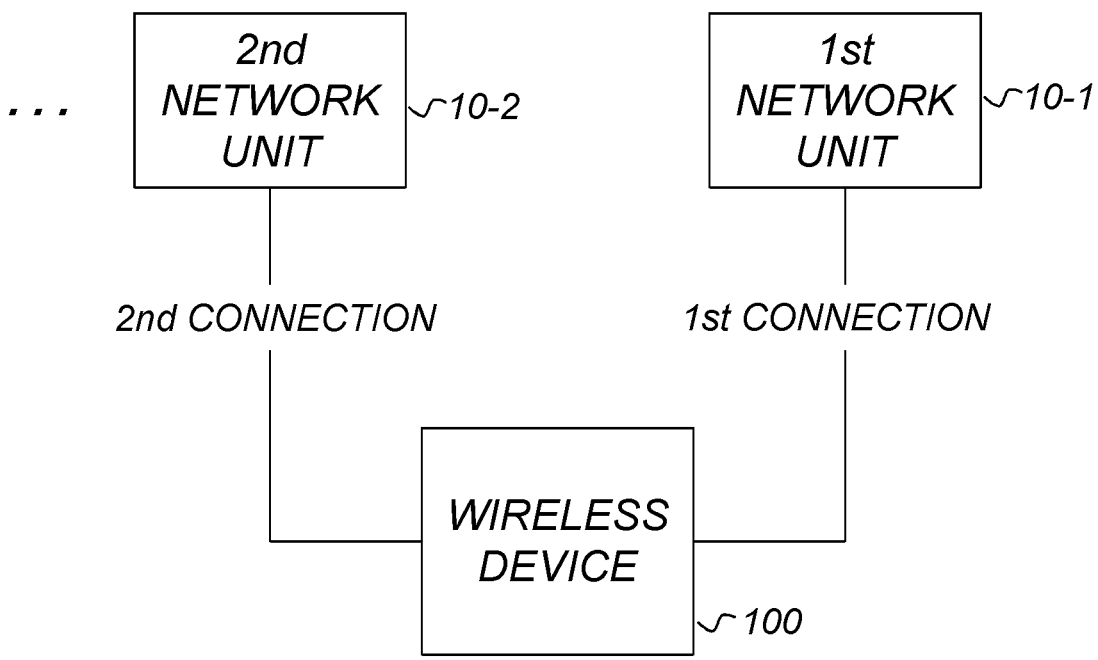
FIG. 1 is a schematic diagram illustrating an example of the general principles of Multi/Dual Connectivity in a wireless communication system.

In the example of FIG. 1, the wireless communication system comprises a wireless communication device 100 having connections to at least two network units 10 including at least a first network unit 10-1 and a second network unit 10-2. The wireless communication device 100 has a first connection to the first network unit 10-1, and a second connection to the second network unit 10-2.

Figure 2:
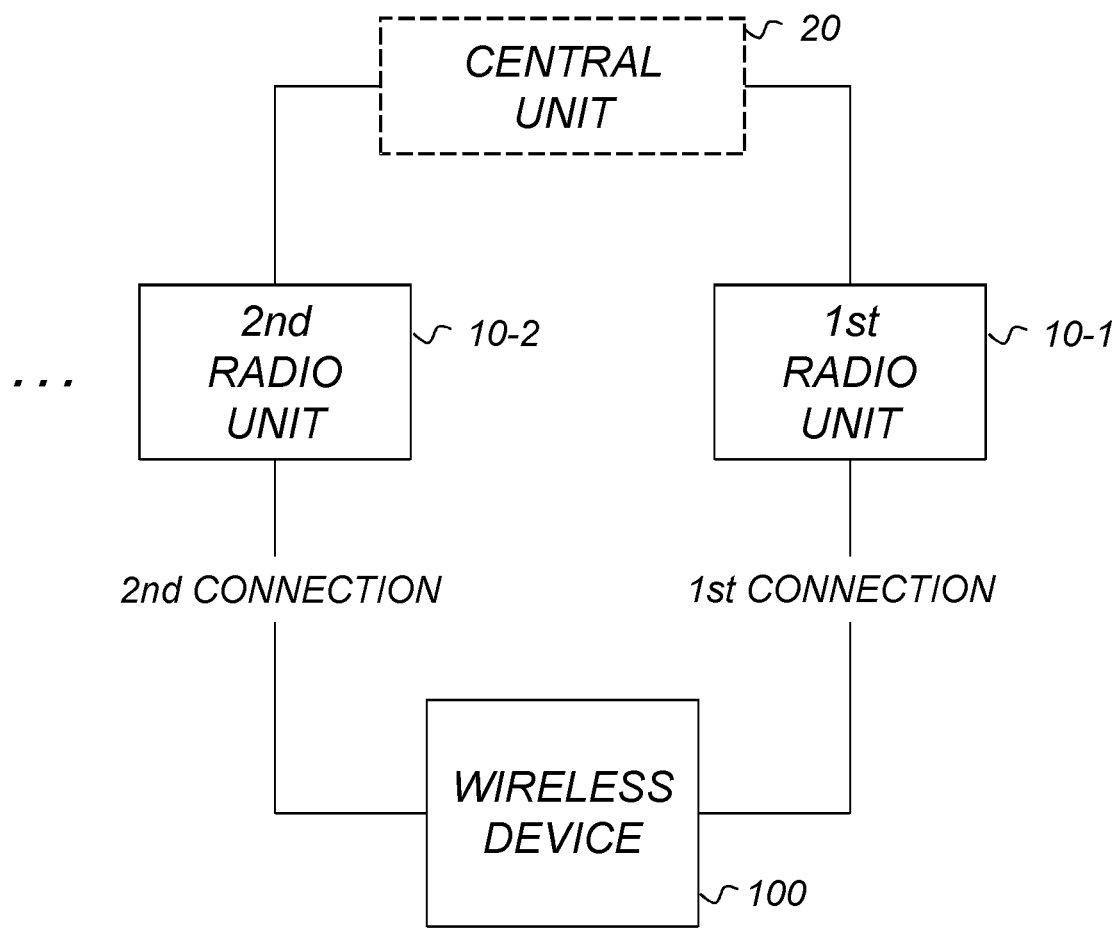
FIG. 2 is a schematic diagram illustrating an example of a Multi/Dual Connectivity system based on two or more radio units being simultaneously connected to a wireless device.
Figure 3:
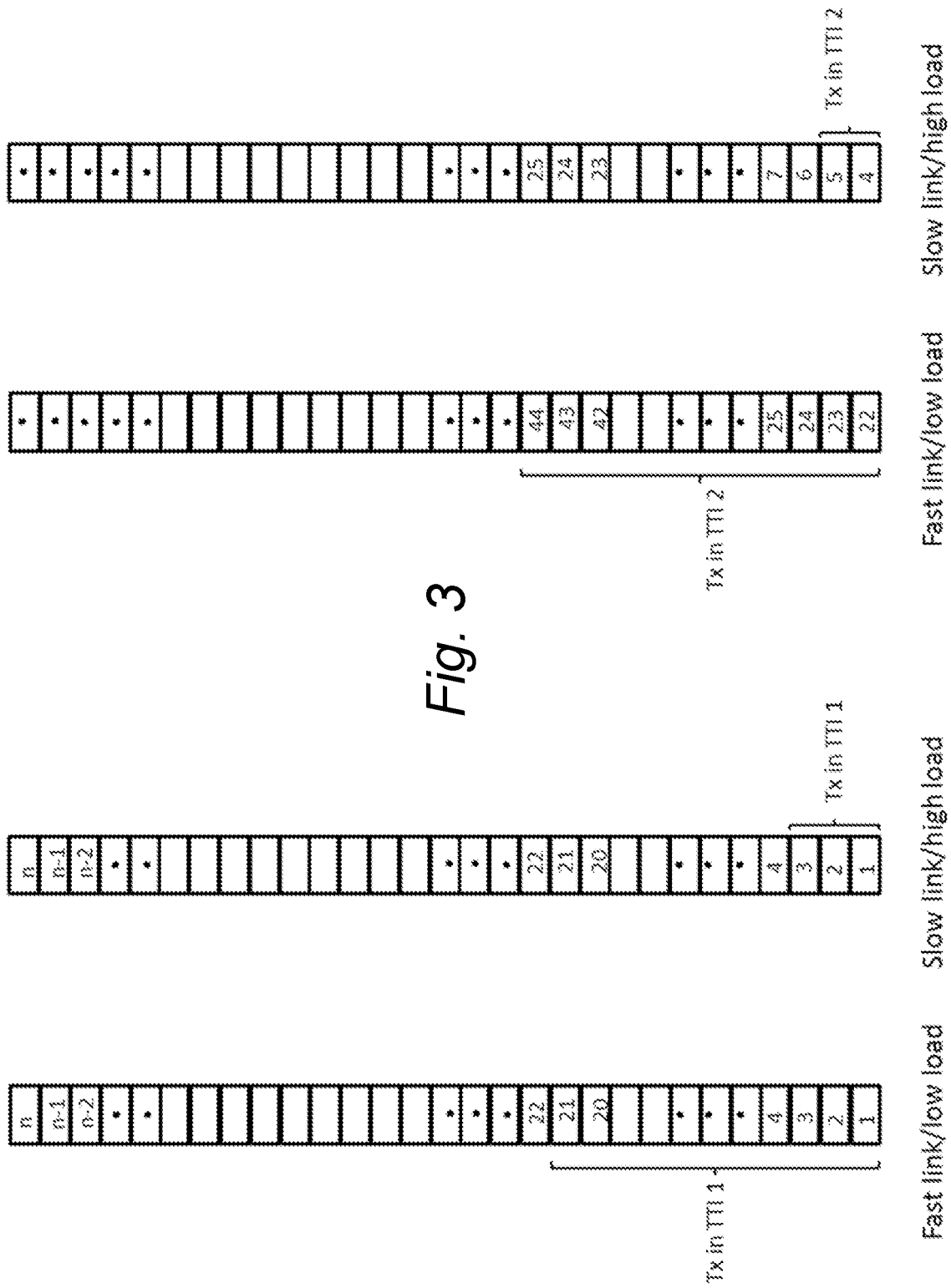
FIG. 3 is a schematic diagram illustrating an example of a situation where different RLC packets are transmitted in a first TTI and already in a second TTI a slow link is transmitting RLC PDUs which were transmitted by a fast link in the first TTI.

Based on a Multi/Dual Connectivity implementation such as that shown in FIG. 1 and/or FIG. 2, packet multiplication/duplication may be provided by transmitting packets comprising the same information over two or more connections. Considering any pair of two connections such as a first connection and a second connection in such a system, packets comprising the same information may thus be transmitted over both the first connection and the second connection.

The first and second connections may be different in type and/or configuration, e.g. the first connection may be over a first Radio Access Technology, RAT, such as LTE, while the second connection may be over a second RAT, e.g. 5G connection, sometimes referred to as New Radio, NR.

As previously mentioned, the case where a network unit such as a wireless device, e.g. a user equipment, has connections to several other network units is referred to as multi-connectivity and the special case with two connections is referred to as dual connectivity. Descriptions of the requirements for supporting Dual Connectivity in LTE is provided in Ref. 3GPP15-36300 (Technical Specification TS 36.300). The network units participating in MC/DC are often referred to as the master eNB, MeNB, and the secondary eNB, SeNB, although symmetric implementations are also possible.

With reference once again to FIG. 2, there is shown a first radio unit 10-1 and a second radio unit 10-2 that are simultaneously connected to a wireless device 100 over a first connection and a second connection, respectively. The radio units 10-1 and 10-2 may optionally be connected to each other and/or to a central unit 20. In a master-secondary implementation, where one of the radio units may be a master eNB and another radio unit may be a secondary eNB, the master eNB may have a coordinating role for connectivity and/or packet multiplication (duplication). However, it is also possible, e.g. by employing the central unit 20, to provide a solution in which the radio units 10-1 and 10-2 do not have to be able to coordinate connectivity and/or packet multiplication (duplication) and may therefore be reduced to mere radio units, e.g. radio units that are able to perform the tasks of the layers below the PDCP layer and where the PDCP functions may instead be provided by the central unit 20.

Figure 4:
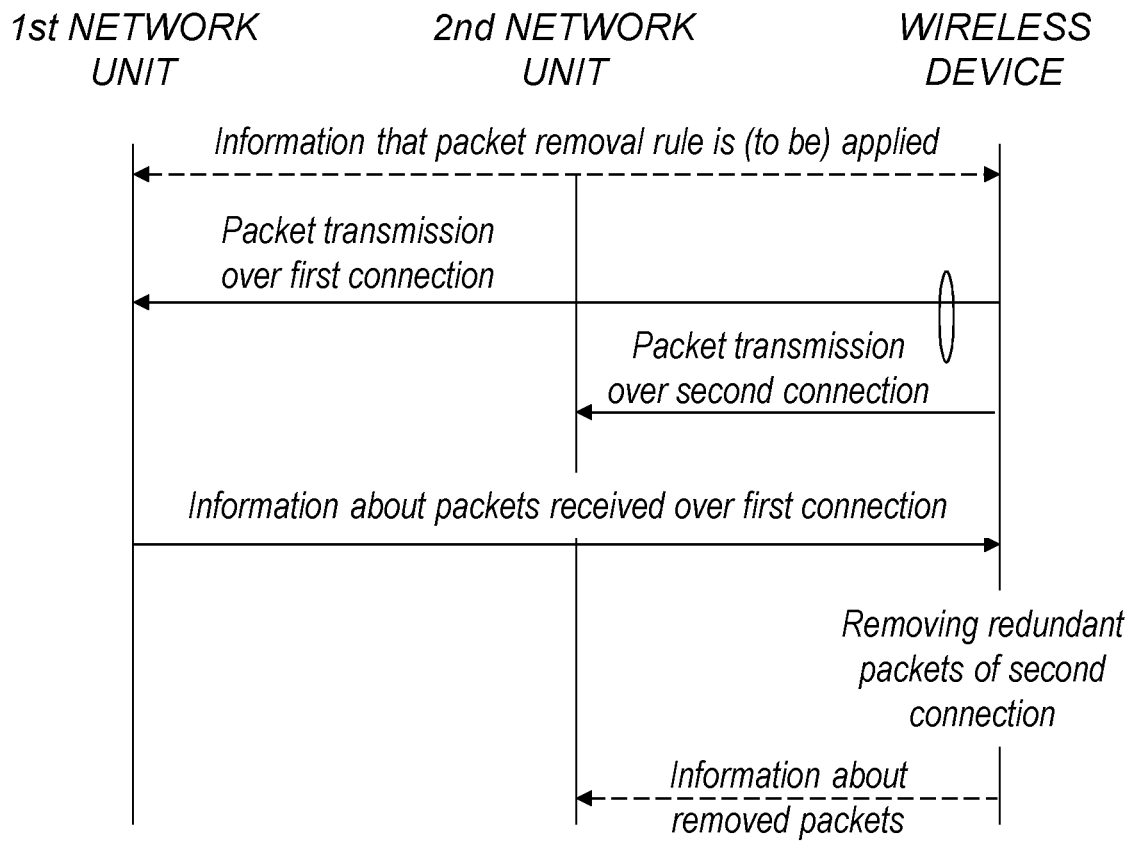
FIG. 4 is a schematic signaling diagram illustrating an example of relevant signaling between a wireless device and network units.

In the following, reference can also be made to the schematic signaling diagram of FIG. 4, which illustrates an example of relevant signaling between the wireless communication device and the network units.

Basically, the wireless communication device 100 performs packet transmission to the first network unit 10-1 over the first connection, and the wireless communication device 100 also performs packet transmission to the second network unit 10-2 over the second connection, assuming multi/dual connectivity and packet multiplication/duplication.

In this particular example, the first network unit 10-1 receives at least part of the transmitted packets and information indicating those packets that have been received over the first connection is transmitted to the wireless communication device 100.

Based on this information, the wireless communication device 100 removes redundant packets for the second connection corresponding to the indicated packets.

Optionally, the wireless communication device may receive information from the network side requesting that a packet removal rule is to be applied, and/or the wireless communication device may send information to the network side indicating that the packet removal rule is applied by the wireless device.

Optionally, the wireless communication device may also send information to at least one of the network units (such as the second network unit) indicating removed packets.

Figure 5:
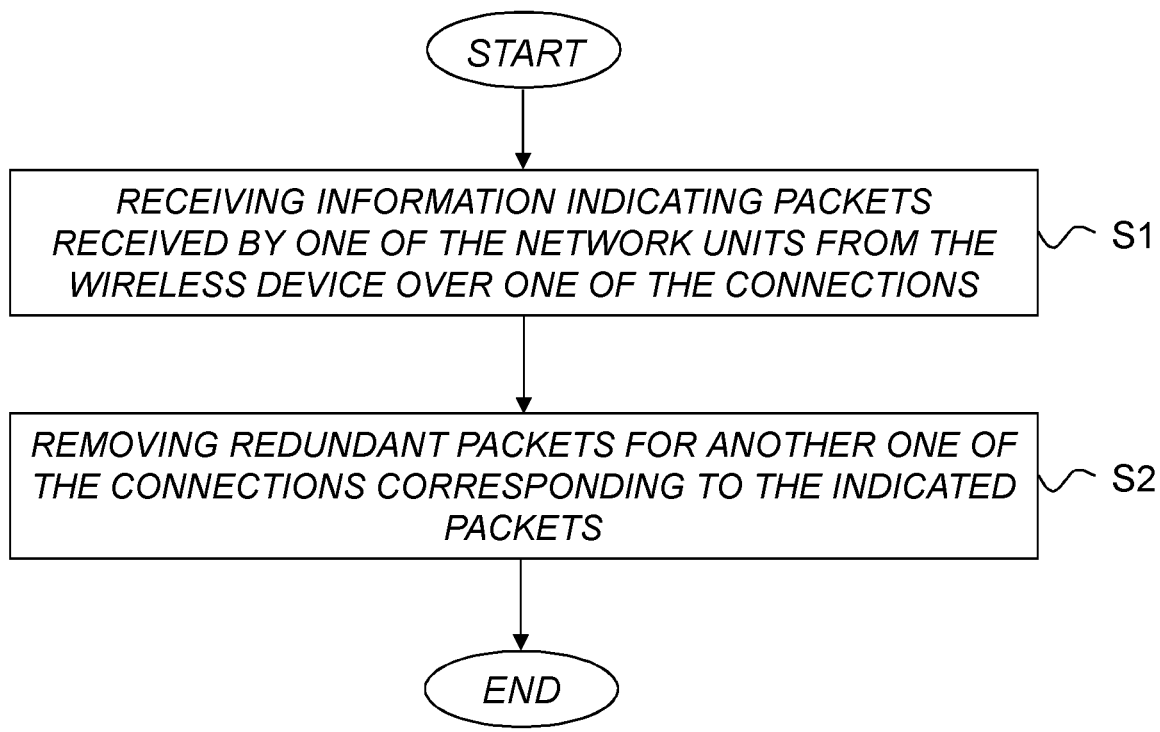
FIG. 5 is a schematic flow diagram illustrating an example of a method of operating a wireless communication device.

FIG. 5 is a schematic flow diagram illustrating an example of a method of operating a wireless communication device adapted for multi-connectivity to enable individual connections to at least two different network units.

Basically, the method comprises:

S1: receiving information indicating packets received by one of the network units from the wireless communication device over one of the connections; and S2: removing redundant packets for another one of the connections corresponding to the indicated packets.

In this way, efficient removal of redundant packet copies is enabled and/or effectuated, resulting in reduced transmissions and/or improved user and system performance in terms of throughput and/or latency.

Figure 6:
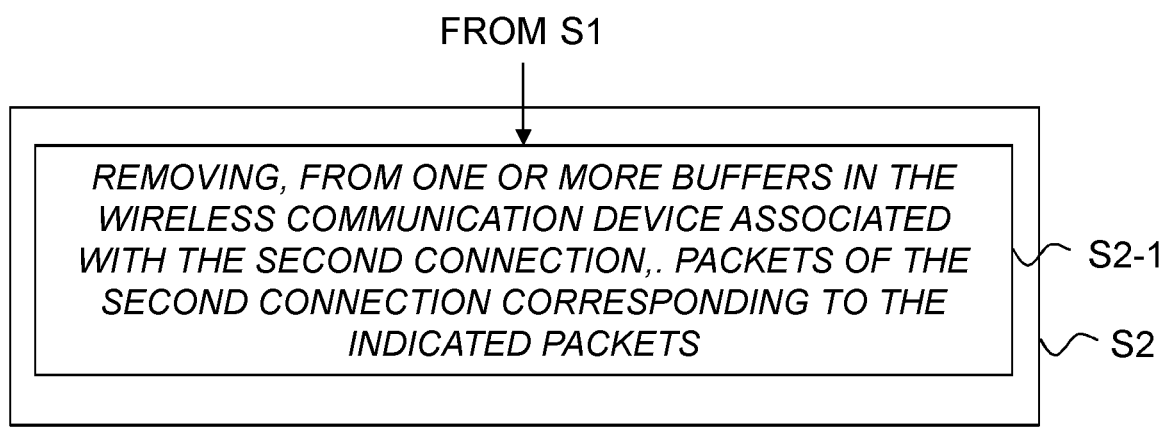
FIG. 6 is a schematic flow diagram illustrating an example of the step of removing redundant packets according to an embodiment.

FIG. 6 is a schematic flow diagram illustrating an example of the step of removing redundant packets according to an embodiment. In this particular example, the individual connections include a first connection to a first network unit and a second connection to a second network unit, wherein packets comprising the same information are transmitted over the first connection and the second connection. By way of example, the step S2 of removing redundant packets comprises removing S2-1, from one or more transmission buffers in the wireless communication device associated with the second connection, packets of the second connection corresponding to the indicated packets received by the first network unit from the wireless communication device over the first connection.

As an example, the wireless communication device may transfer the information, indicating the packets received by the first network unit from the wireless communication device over the first connection, within the wireless communication device from the Packet Data Convergence Protocol, PDCP layer to the Radio Link Control, RLC, layer and Medium Access Control, MAC, layer to enable the wireless communication device to stop transmission of the corresponding data units of the indicated packets and remove the data units from one or more transmission buffers associated with the second connection.

In a particular example, the wireless communication device maintains a mapping between higher layer packets and lower layer data units, and the mapping is used by the wireless communication device for removing lower layer data units, corresponding to indicated higher layer packets, from transmission buffer(s) associated with the second connection.

For example, the mapping may be a mapping between PDCP, RLC, and MAC packets or data units.

More specifically, the mapping may be a mapping between PDCP packet sequence numbers, RLC packet sequence numbers and HARQ process identity numbers.

Figure 7:
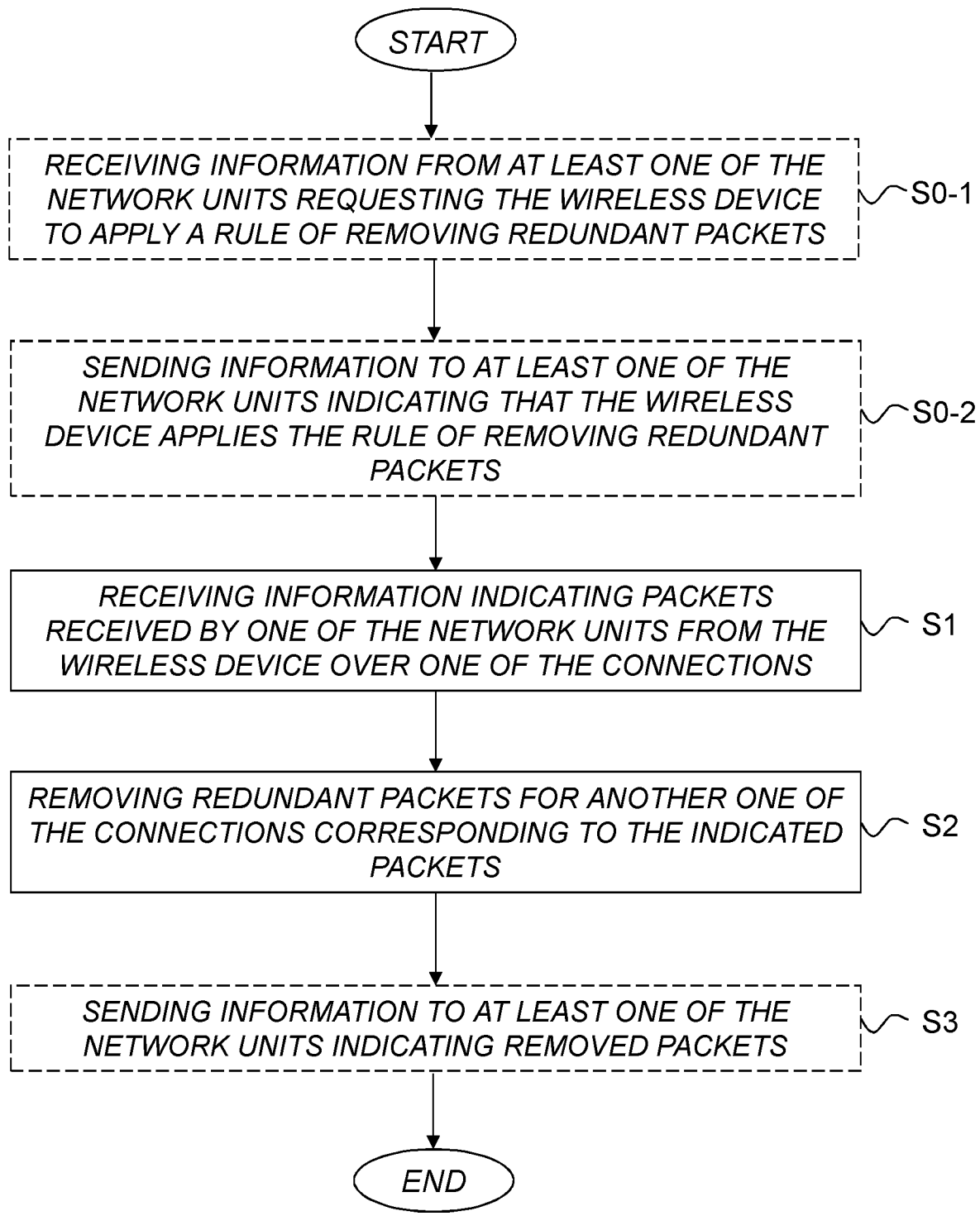
FIG. 7 is a schematic flow diagram illustrating another example of a method of operating a wireless communication device.

FIG. 7 is a schematic flow diagram illustrating another example of a method of operating a wireless communication device. In this particular example, the method optionally comprises receiving S0-1 information from at least one the network units requesting the wireless communication device to apply a rule of removing redundant packets and/or sending S0-2 information to at least one of the network units indicating that the wireless communication device applies the rule of removing redundant packets.

By way of example, the wireless communication device may receive and/or send the information by means of Radio Resource Control, RRC, signaling.

Optionally, the method may also comprise sending S3 information to at least one of the network units indicating removed packets.

For example, the wireless communication device may send the information indicating removed packets in at least one Medium Access Control, MAC, control element.

As an example, the wireless communication device may inform at least one of the network units of removed packets by means of a summary message comprising information indicating removed packets from at least two occasions of removing redundant packets. This message may for example be event-triggered (e.g. in response to a predefined number of occasions of removing packets) or sent occasionally or periodically.

The above mentioned step(s) of sending information may as an example involve sending the information piggybacked on uplink control signaling or piggybacked on user data.

The following features may be generally applicable to the disclosed method of operating a wireless communication device:

The network units may be radio network nodes, and the connections may be uplink connections.

The wireless communication device may be adapted for dual connectivity.

The connections may be based on different radio access technologies.

In the following, a brief discussion of some non-limiting aspects of the proposed technology will be presented.

According to an aspect, there is thus provided a mechanism to remove packet copies of the second uplink connection if the first uplink connection has already successfully transmitted the packets, thus making the second uplink connection packets redundant. Hence, the idea is to avoid sending the too late packets on the second uplink connection. This eliminates the risk that the second uplink connection falls behind and also reduces interference as redundant packets are not transmitted.

It is beneficial to keep a mapping between the higher protocol layer packets and the lower protocol layer packets or data units to which the higher layer protocol packets correspond.

Preferably, a rule in the wireless communication device is defined indicating that it is ok and possibly agreed upon with the network units to remove redundant packet copies on one or several connections. This is to improve potential fault handling in the network units. Further, the proposed technology also suggests a message or message sequence to agree upon the use of the rule, and/or other messages that states that the rules has been applied and/or to which packets.

In other words, a rule is provided in the wireless device that it shall remove redundant packets of one connection if those packets have been received on another connection.

By way of example, there may also be provided a message, or message sequence, between the nodes that the rule is applied in the wireless device. This message or sequence could be implemented by means of a RRC IE, or other protocol layer messages.

Further, it may be beneficial to provide a message between the wireless device and one or more of the involved network units indicating that redundant packets have been removed and/or which redundant packets that have been removed. This message could be for example a MAC CE. The message may be a summary message sent occasionally containing several occasions of removed redundant packets or an instant information message sent as the redundant packets are removed.

For example, the above information and/or message(s) can be piggybacked on other signaling and/or user data packets that anyway goes in the uplink, such as acknowledgement/non-acknowledgement for packets received in the downlink.

The proposed technology may offer one or more of the following advantages:

The solution reduces the overhead from unnecessary transmission on the second connection in the packet multiplication/duplication scenario of multi/dual connectivity.

The solution will avoid protocol layers receive window stalling due to lack of information that redundant packets have been removed.

The solution will improve system and/or user performance in terms of throughput and/or latency, especially in the packet multiplication/duplication scenario of multi/dual connectivity as defined in 3GPP and make it applicable in further deployment scenarios.

Figure 8:
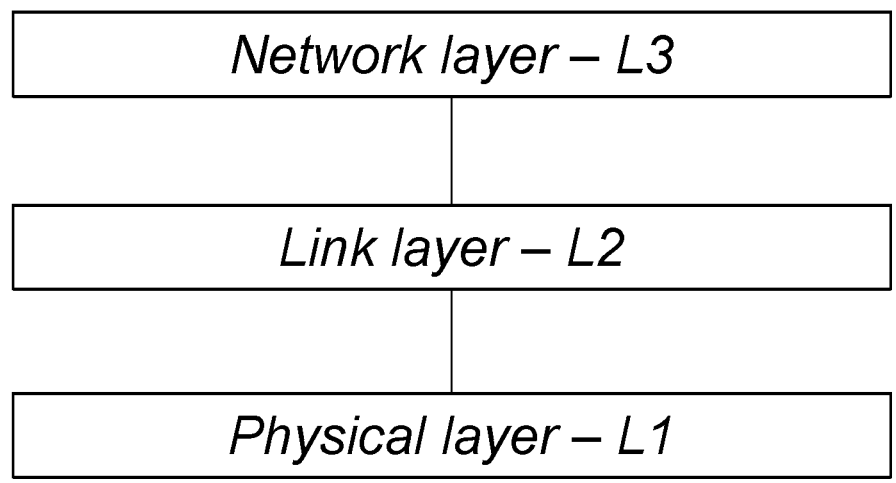
FIG. 8 is a schematic diagram illustrating an example of a protocol stack of a wireless communication system divided into three different layers: the physical layer, the link layer, and the network layer.
Figure 9:
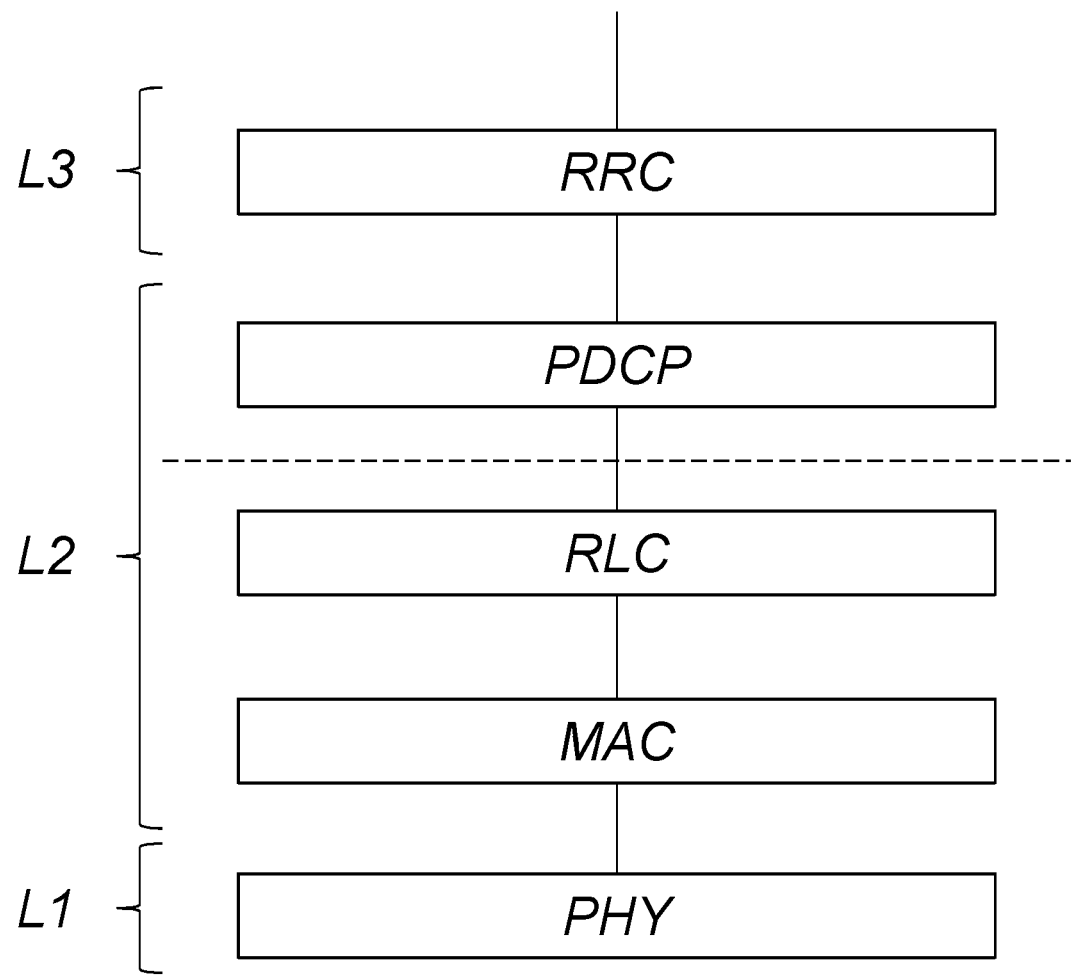
FIG. 9 is a schematic diagram illustrating a particular example of three protocol layers, including sub-layers, of a protocol stack suitable for a wireless communication system.

For a better understanding of the proposed technology, a brief overview of a few non-limiting examples of the protocol stack of a wireless communication system can be made with reference to FIG. 8 and FIG. 9.

According to well-accepted technology, a simple way to illustrate a protocol stack of a wireless communication system is to divide the stack into three different layers: the physical layer, the link layer, and the network layer, as schematically shown in FIG. 8. The physical layer is sometimes referred to as layer 1, L1. The link layer is sometimes referred to as layer 2, L2. The network layer is sometimes referred to as layer 3, L3.

FIG. 9 is a schematic diagram illustrating a particular example of three protocol layers, including sub-layers, of a protocol stack suitable for a wireless communication system such as LTE, NR and the like.

The protocol stack is typically implemented for some form of underlying network unit or device including radio circuitry coupled to one or more antennas and/or circuits for communication with other similar network units such as network nodes, end user equipment and/or other network devices.

The lowest layer, L1, is the Physical Layer, PHY, followed by layer 2, L2, which includes the Medium Access Control, MAC, layer, the Radio Link Control, RLC layer, and the Packet Data Convergence Control, PDCP, layer. Layer 3, L3, includes the Radio Resource Control, RRC, layer and optionally also other sub-layers.

L1 handles uplink and downlink in the Physical Layer, Layer 1 of the protocol stack. In uplink, L1 may for example process antenna data received from the radio circuitry, which processing may include removing cyclic prefix, running Fast Fourier Transform, FFT, to extract sub-channels, decoding/demodulating symbols, extracting physical channels and passing user information up to the MAC layer of L2. In downlink, L1 may for example take user data provided by the MAC lower of L2. Examples of tasks that may be performed by L1 in downlink may include constructing physical channels, performing turbo coding, scrambling, modulating, layer mapping, pre-coding, frequency mapping, inverse FFT, and cyclic prefix insertion and sending antenna data to the radio circuitry. To handle this processing, specialized hardware may be used, including accelerators, to form processing chains.

L2 typically includes a synchronous part and an asynchronous part. The synchronous part of L2 normally includes the MAC and RLC sub-layers. The asynchronous part of L2 normally includes the PDCP sub-layer.

The MAC sub-layer may have a separate entity for each connected UE, and a few additional entities for common needs such as system information, paging, and random access response. The RLC sub-layer may have a separate entity for each logical channel, corresponding to radio bearers. Downlink and uplink may operate independently of each other, with some signaling forwarded from the uplink to the downlink. Downlink: A task of synchronous L2 in downlink may be to take PDCP Packet Data Units, PDUs, from a PDCP PDU buffer and build MAC PDUs that are sent to L1. This may be triggered by a transmit order from User Plane Control, UPC, and is normally part of a latency-critical processing path. For example, less than 0.5 ms may be allowed for the synchronous L2 processing in downlink. In split scenarios this includes transport latency as well as processing latency. In downlink the synchronous part of L2 may also handle multiplexing of logical channels, HARQ retransmissions, MAC control elements, MAC procedures such as random access, RLC PDU buffering and retransmissions, and RLC status messages. The PDCP PDU buffers may typically be shared between the asynchronous part of L2 and the synchronous part of L2. If this is not possible, for example, if the asynchronous part of L2 is placed at a different site, a flow control mechanism may be added to transfer PDCP PDUs from the asynchronous part of L2 to the synchronous part of L2. Uplink: A task of the synchronous part of L2 in uplink may be to deconstruct MAC PDUs received from L1 into PDCP PDUs that are delivered to the asynchronous part of L2. In uplink, the synchronous part of L2 may also handle MAC control elements, MAC procedures such as random access, demultiplexing of logical channels, RLC PDU buffering, reordering and retransmissions, and RLC status messages. In uplink the synchronous part of L2 may typically not be part of a latency critical processing path, but may have a direct impact on the end-to-end packet latency.

User Plane Control (not shown explicitly in FIG. 9) comprises fast Radio Resource Management, RRM, functions that may occur on a per-sub-frame basis. This may e.g. include air-interface resource scheduling, link adaptation (transport format selection), and power control. UPC may use input from L1 and/or the synchronous part of L2, and generate messages to L1 and/or the synchronous part of L2. The input may include buffer status reports, measurement reports, Channel Quality Indicator, CQI, reports, and HARQ feedback. The messages may be control information sent to the UEs, as well as uplink and downlink scheduling commands sent to L1 and the synchronous part of L2. UPC may thus handle scheduling and optimization problems, involving many UEs and shared resources such as spectrum, power, and hardware.

As indicated, the asynchronous part of L2 normally includes the PDCP layer, whose primary tasks may be ciphering, header compression, and integrity protection for signaling. It may also support lossless handover. In downlink, the asynchronous part of L2 may maintain a PDCP PDU buffer, which is often shared with the synchronous part of L2. In cases where this is not possible, such as if L2 is split between different sites, a flow-control mechanism may be needed to transfer PDUs between the asynchronous part of L2 and the synchronous part of L2.

The L3 sub-layer RRC normally includes the control of one or more of the following functions: connection handling, such as setup and release of connections, mobility handling, such as handover or redirection release, UE Measurement Control, Load Management, such as Inter-Frequency Load Balancing and Offload, and Enhanced Multimedia Broadcast and Multicast Services, eMBMS. By way of example, services and functions of the RRC sub-layer of L3 may also include broadcast of System Information, key management, establishment, configuration, maintenance and release of point-to-point Radio Bearers.

NAS, which may also be regarded as part of L3, typically form the highest stratum of the control plane between the UE and the Mobility Management Entity, MME. NAS supports the mobility of the UE and the session management procedures to establish and maintain IP connectivity between the UE and a corresponding gateway.

Figure 10:
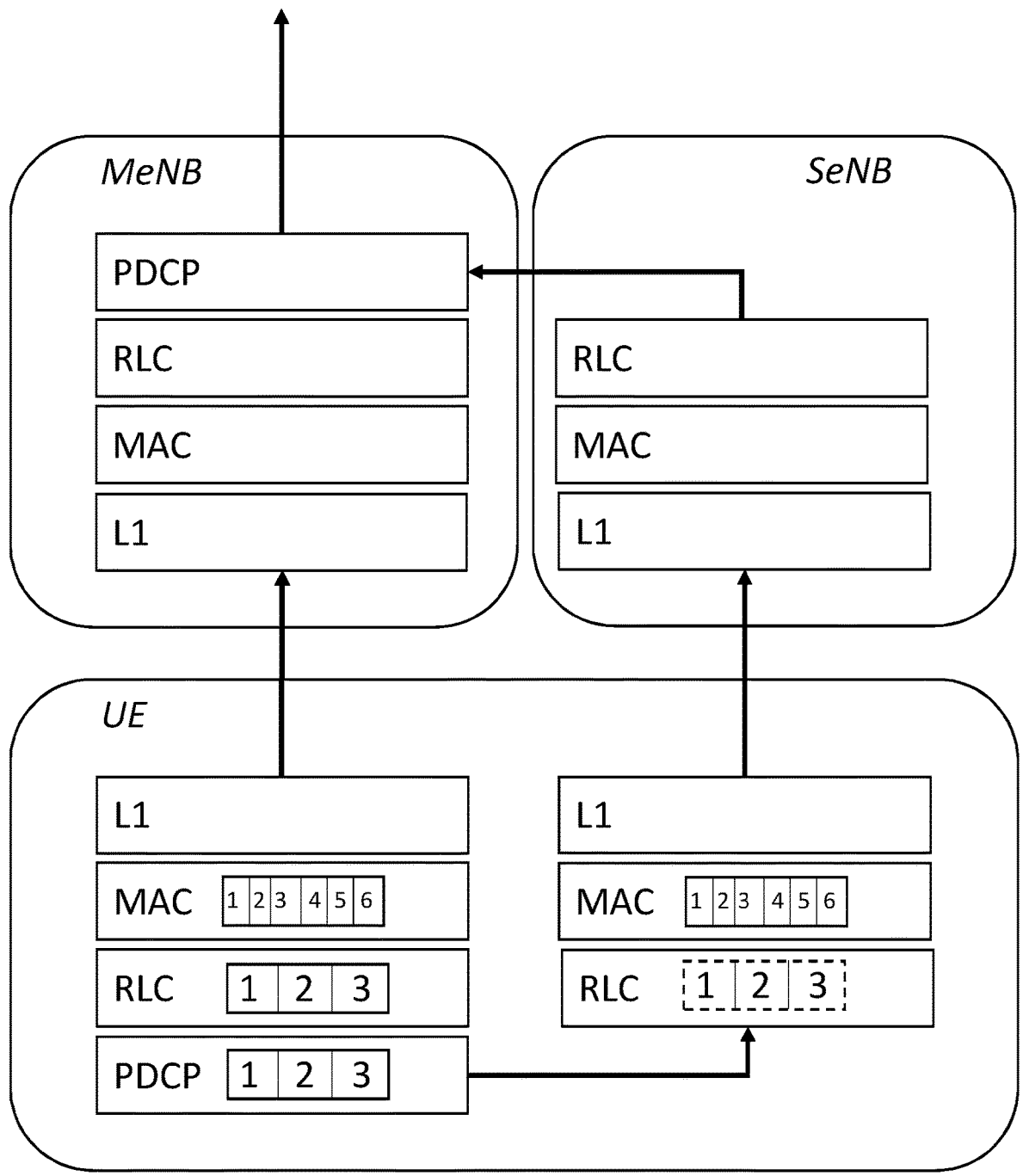
FIG. 10 is a schematic diagram illustrating a particular example of a wireless device adapted for multi/dual connectivity to enable connections to two radio base stations, using the protocol stack described in connection with FIG. 9.

FIG. 10 is a schematic diagram illustrating a particular example of a wireless device adapted for multi/dual connectivity to enable connections to two radio base stations, using the protocol stack described in connection with FIG. 9. FIG. 10 shows uplink dual connectivity according to [3GPP R2-165330] split bearer type. Duplication of packets using dual connectivity is turned on. Packets are duplicated and sent to a MeNB and a SeNB. The PDCP SDUs are then packetized by RLC and MAC. In this case one MAC PDU carries half a PDCP packet. Packets received at SeNB are forward to MeNB over X2.

Figure 11:
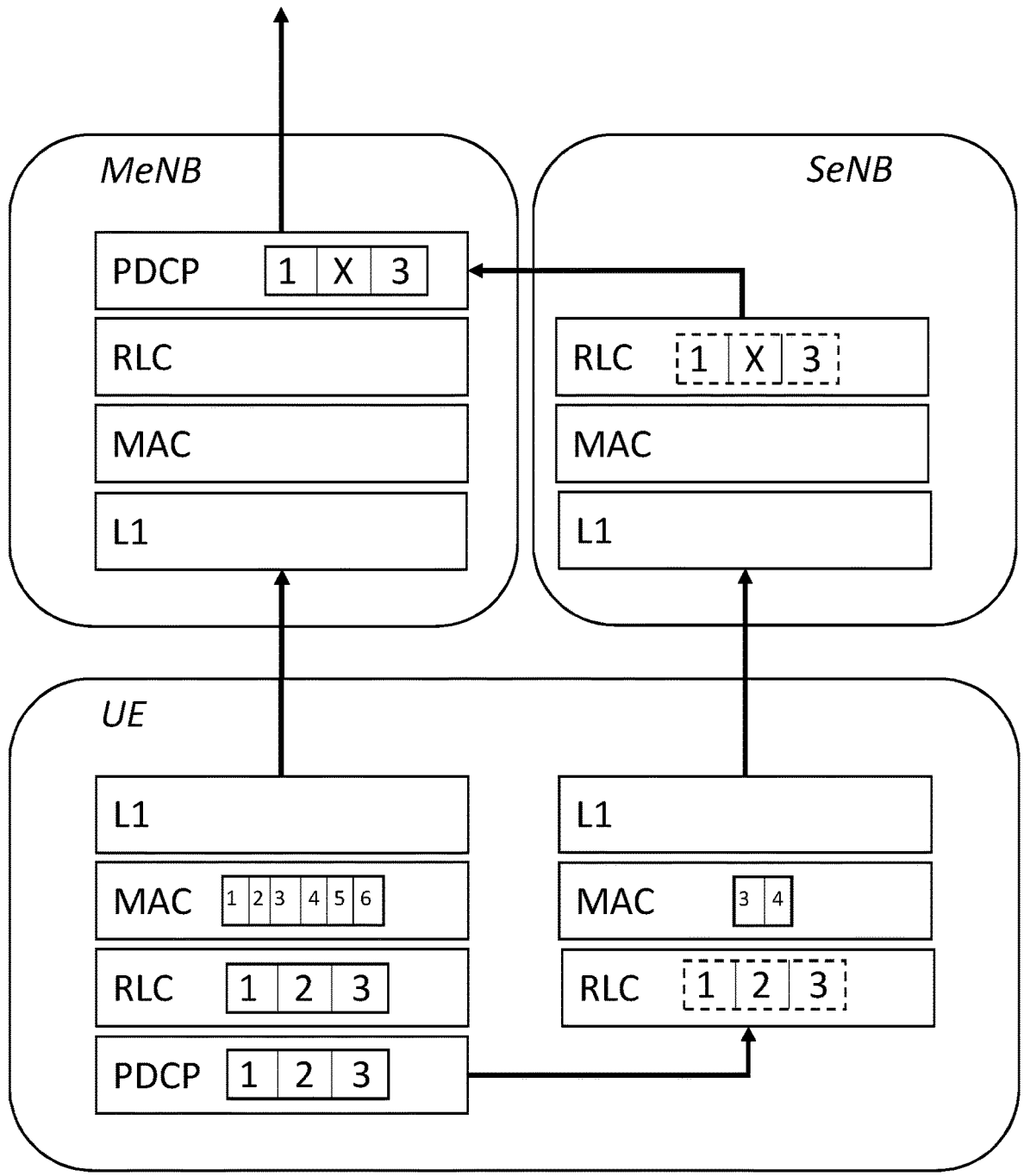
FIG. 11 is a schematic diagram similar to FIG. 10 illustrating a particular example in which a number of packets have been received by the network over a first one of the connections.

FIG. 11 is a schematic diagram similar to FIG. 10 illustrating a particular example in which a number of packets have been received by the network over a first one of the connections. FIG. 11 shows that the SeNB receives RLC packets 1 and 3. Number 2 is still being transmitted or up for retransmission. The UE RLC entity is informed that SeNB has received packets 1 and 3. The MeNB has, thus, received PDCP packets 1 and 3 from the UE, but only via SeNB.

Figure 12:
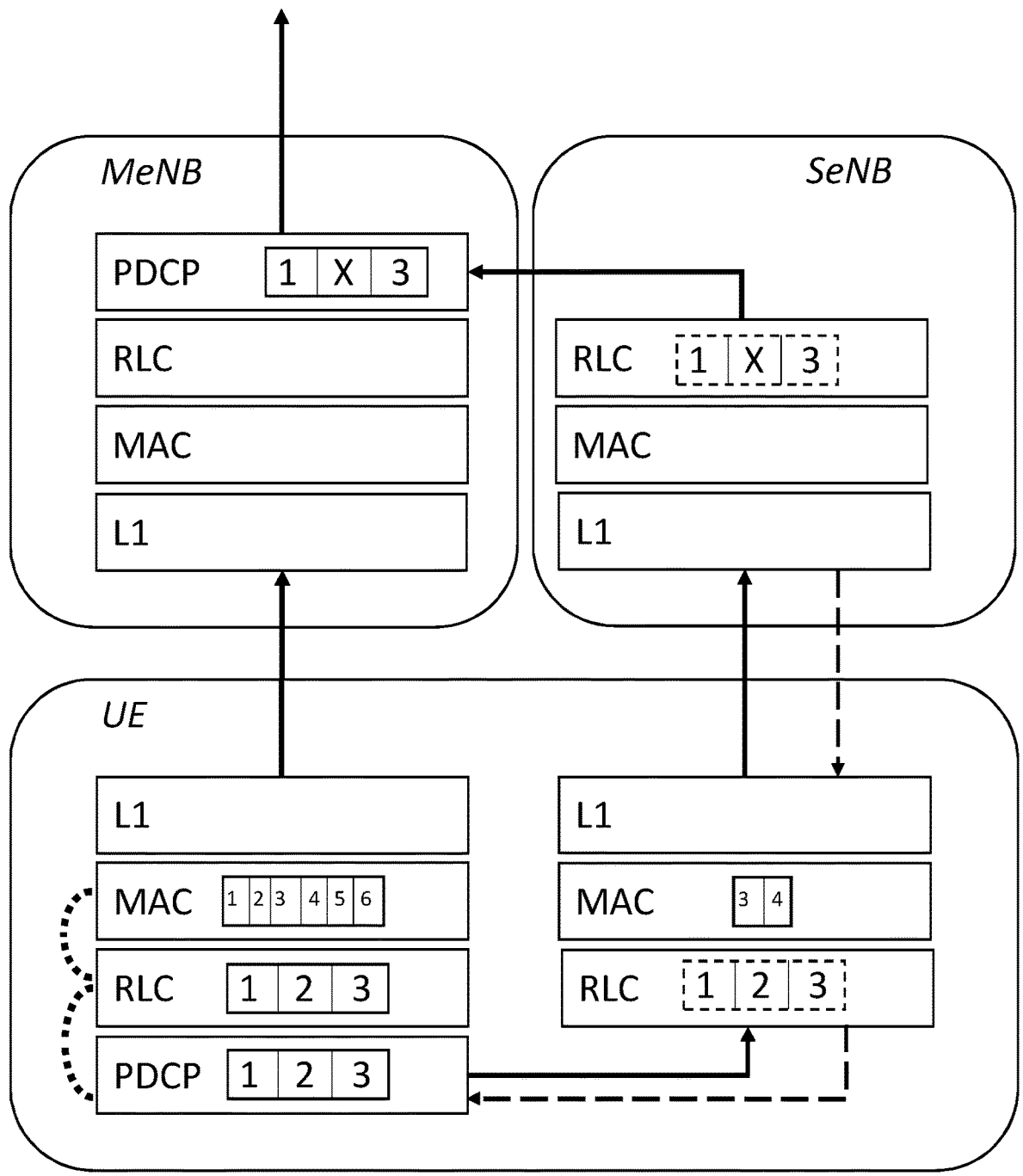
FIG. 12 is a schematic diagram similar to FIG. 10 illustrating a particular example in which the wireless device receives information indicating those packets that have been received by the network over the first one of the connections, and this information is transferred to the lower layers to enable the wireless device to stop transmission and remove the corresponding data units of the indicated packets from one or more transmission buffers associated with a second connection.

FIG. 12 is a schematic diagram similar to FIG. 10 illustrating a particular example in which the wireless device receives information indicating those packets that have been received by the network over the first one of the connections, and this information is transferred to the lower layers to enable the wireless device to stop transmission and remove the corresponding data units of the indicated packets from one or more transmission buffers associated with a second connection. FIG. 12 shows how the UE trickles down the information to the RLC and MAC layer to stop transmission of PDUs that contains only whole or parts of PDCP packets 1 and 3. If a RLC or MAC data unit holds information from any other PDCP packet it must not stop the transmission of those data units. The RLC and MAC stops transmission of the corresponding data units of PDCP packets 1 and 3, and removes those from their buffers.

Preferably, the UE keeps a mapping between PDCP, RLC, and MAC packets in order to be able to remove the corresponding acknowledged packets received via the first connection also for the second connection. For example, this can be done by keeping a mapping between the PDCP sequence number and the RLC sequence numbers and HARQ process identity.

Figure 13:
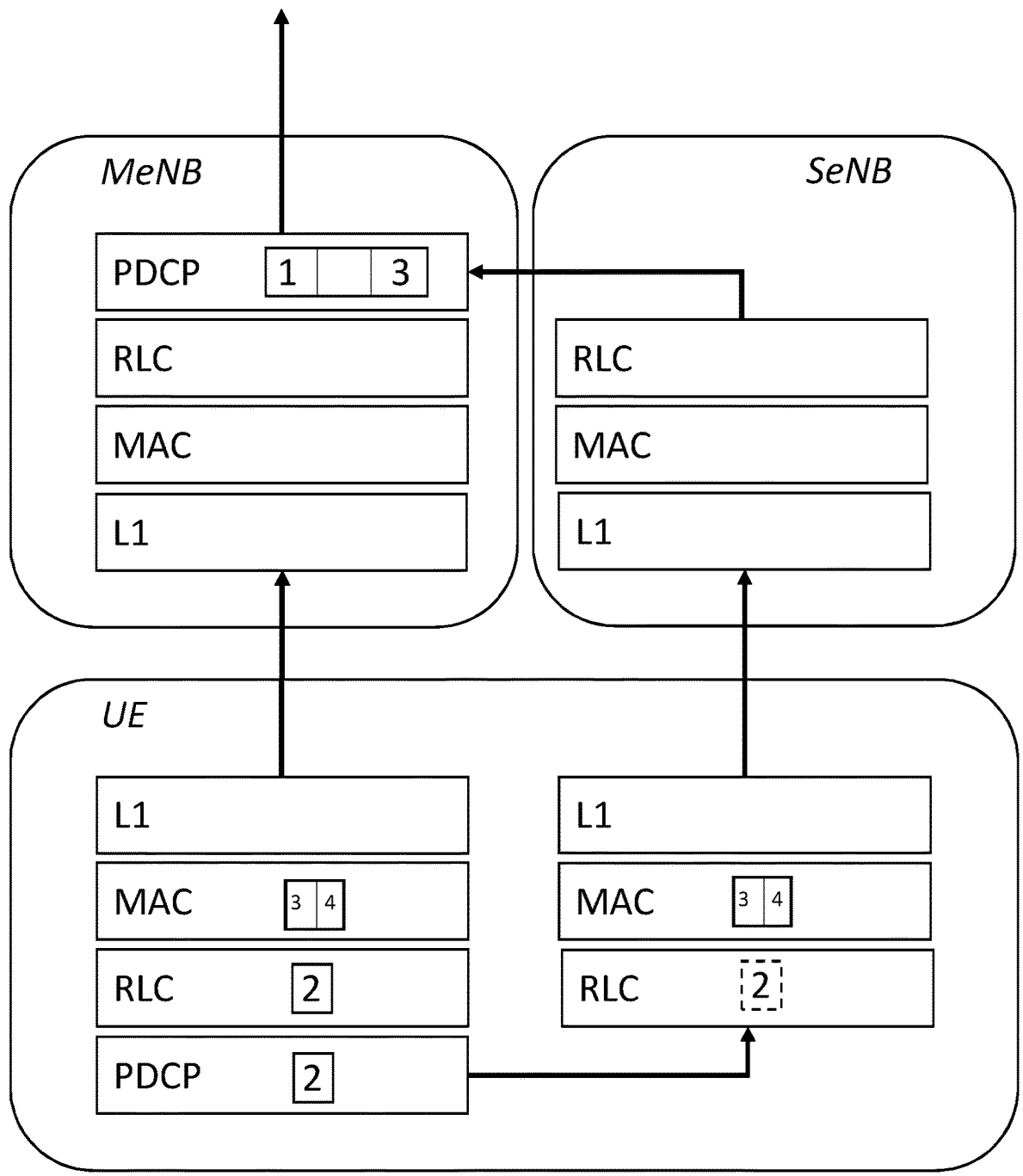
FIG. 13 is a schematic diagram similar to FIG. 10 illustrating a particular example showing the status of the buffers after packet removal.

FIG. 13 is a schematic diagram similar to FIG. 10 illustrating a particular example showing the status of the buffers after packet removal. FIG. 13 shows the status of the buffers, for both the first connection and the second connection, when the PDCP packets 1 and 3 have been removed from the buffers of the UE. The technical effect of the proposed technology can easily be appreciated by a simple comparison between FIG. 12 and FIG. 13.

To improve the fault handling and avoid causing ambiguity in the network units or nodes or even in the system of UE-to-network communication it is vital that the network has knowledge that the UE performs the removal of redundant packets. For example, this may be done in at least two ways.

First and potentially the simplest way is to have a rule in the transmitting node (UE) that it shall remove redundant packets, and that is agreed upon with the receiving nodes (network units).

By way of example, the use of this rule may be signaled and agreed upon at e.g. packet duplication initiation. For example, via a RRC message or included as an information element in an existing RRC message.

A second way is that the transmitting node (UE) uses a message to inform the receiving node (network unit) that would have received the redundant packets that those packets has been removed. This may be a summary message sent occasionally containing several occasions of removed redundant packets or an instant information message sent as the redundant packets are removed. The message may for example be a MAC control element PDU. Such a MAC control element (MAC CE) would also allow for the RLC layer of the relevant network unit to update the receiving windows and also update the MAC HARQ process. This avoids unnecessary request for retransmission on the connection when redundant packets are removed. The information of this message can also be piggybacked on other signaling and user data packets that anyway goes in the uplink such as acknowledgement/non-acknowledgement signaling, e.g. RLC or MAC (HARQ) acknowledgments, for packets received in the downlink.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided a wireless communication device configured for multi-connectivity to enable individual connections to at least two different network units. The wireless device is configured to receive information indicating packets received by one of the network units from the wireless communication device over one of the connections. The wireless communication device is also configured to remove redundant packets for another one of the connections corresponding to the indicated packets By way of example, the individual connections include a first connection to a first network unit 10-1 and a second connection to a second network unit 10-2, wherein packets comprising the same information are transmitted over the first connection and the second connection. The wireless communication device 100 is configured to remove, from one or more transmission buffers in the wireless communication device associated with the second connection, packets of the second connection corresponding to the indicated packets received by the first network unit 10-1 from the wireless communication device over the first connection.

In a particular example, as previously explained, the wireless communication device 100 may be configured to transfer the information, indicating the packets received by the first network unit from the wireless communication device over the first connection, within the wireless communication device from the Packet Data Convergence Protocol, PDCP layer to the Radio Link Control, RLC, layer and Medium Access Control, MAC, layer to enable the wireless communication device to stop transmission of the corresponding data units of the indicated packets and remove the data units from one or more transmission buffers associated with the second connection.

For example, the wireless communication device 100 may be configured to maintain a mapping between higher layer packets and lower layer data units, and the mapping may be used by the wireless communication device for removing lower layer data units, corresponding to indicated higher layer packets, from transmission buffer(s) associated with the second connection.

In a particular example, the wireless communication device 100 may be configured to maintain a mapping between PDCP, RLC, and MAC packets or data units.

As an example, the wireless communication device 100 may be configured to maintain a mapping between PDCP packet sequence numbers, RLC packet sequence numbers and HARQ process identity numbers.

Optionally, the wireless communication device 100 may be configured to receive information from at least one the network units requesting the wireless communication device to apply a rule of removing redundant packets and/or send information to at least one of the network units indicating that the wireless communication device applies a rule of removing redundant packets.

For example, the wireless communication device 100 may be configured to receive and/or send the information by means of Radio Resource Control, RRC, signaling.

Optionally, the wireless communication device may be configured to send information to at least one of the network units indicating removed packets.

By way of example, the wireless communication device 100 may be configured to send the information indicating removed packets in at least one Medium Access Control, MAC, control element.

Preferably, the wireless communication device 100 may be configured to inform at least one of the network units of removed packets by means of a summary message comprising information indicating removed packets from at least two occasions of removing redundant packets.

As an example, the connections may be uplink connections to radio network units.

As another example, the wireless communication device 100 may be adapted for dual connectivity.

Further, it should be understood that the connections may be based on different radio access technologies.

Figure 14:
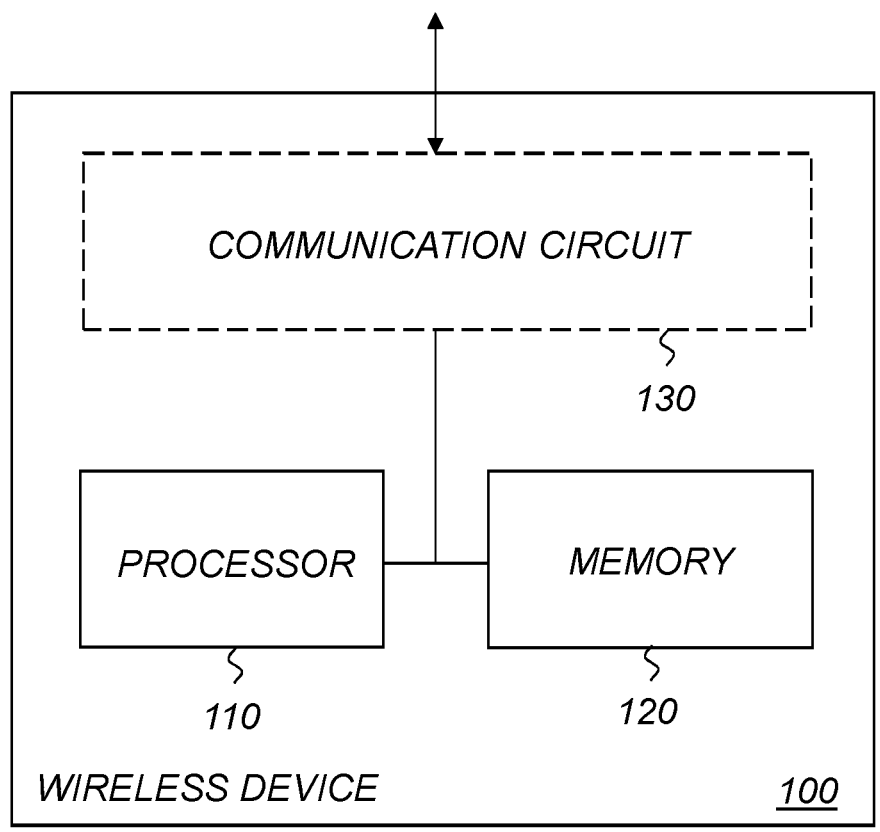
FIG. 14 is a schematic block diagram illustrating an example of a wireless communication device, based on a processor-memory implementation according to an embodiment.

FIG. 14 is a schematic block diagram illustrating an example of a wireless communication device 100, based on a processor-memory implementation according to an embodiment. In this particular example, the wireless communication device 100 comprises a processor 110 and a memory 120, the memory 120 comprising instructions executable by the processor 110, whereby the processor is operative to perform the functions described herein including removing redundant packets.

The wireless communication device 100 may also include a communication circuit 130. The communication circuit 130 may include functions for wireless communication with other network units and/or devices in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 15:
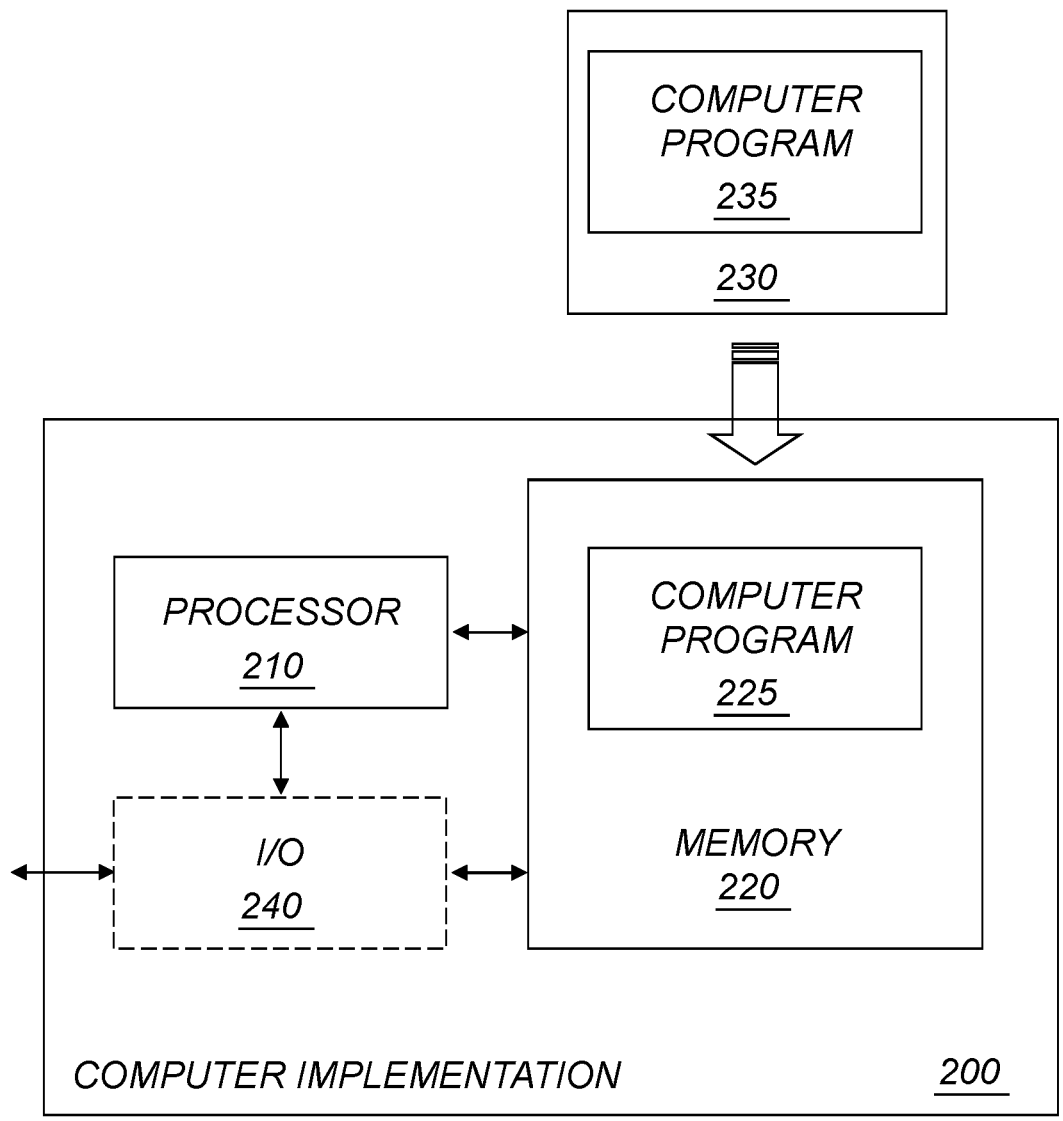
FIG. 15 is a schematic diagram illustrating an example of a computer-implementation according to an embodiment.

FIG. 15 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to perform the actions described herein.

According to a third aspect, there is provided a computer program for operating, when executed by a processor, a wireless communication device adapted for multi-connectivity to enable individual connections to at least two different network units. The computer program comprises instructions, which when executed by the processor, cause the processor to:

receive information indicating packets received by one of the network units from the wireless communication device over one of the connections; and remove redundant packets for another one of the connections corresponding to the indicated packets.

According to a fourth aspect, there is provided a computer program product comprising a computer-readable medium carrying a computer program according to the third aspect.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 16:
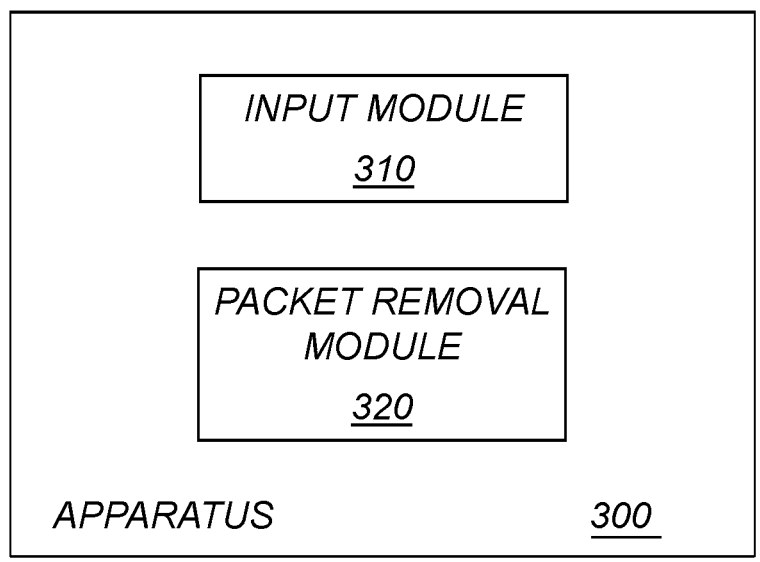
FIG. 16 is a schematic diagram illustrating an example of an apparatus for handling redundant packet copies for a wireless communication device adapted for multi-connectivity and having individual connections to at least two different network units.

FIG. 16 is a schematic diagram illustrating an example of an apparatus for handling redundant packet copies for a wireless communication device adapted for multi-connectivity and having individual connections to at least two different network units. The apparatus 300 comprises an input module 310 for receiving information indicating packets received by one of the network units from the wireless communication device over one of the connections. The apparatus 300 also comprises a packet removal module 320 for removing redundant packets for another one of the connections corresponding to the indicated packets.

Alternatively it is possible to realize the module(s) in FIG. 16 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

R2-163399, Summary of email discussion [93bis #23][NR] Deployment scenarios
R2-164027, Tight integration of NR and LTE—User Plane design
R2-165330, Dual Connectivity based link switch between LTE and NR

The invention claimed is:

1. A method of operating a wireless communication device adapted for multi-connectivity to enable individual connections to at least first and second network units, wherein the method comprises:
 receiving information indicating higher-layer packets received by the first network unit from the wireless communication device over a first one of the connections; and
 based on a mapping between higher-layer packets and lower-layer data units, as maintained by the wireless communication device, removing lower-layer data units corresponding to the indicated higher-layer packets from one or more transmission buffers associated with a second one of the connections.

2. The method of claim 1, wherein higher-layer packets comprising the same information are transmitted over the first connection and the second connection as redundant packets.

3. The method of claim 1, further comprising transfering the information, indicating the higher-layer packets received by the first network unit over the first connection, within the wireless communication device from the Packet Data Convergence Protocol, PDCP, layer to the Radio Link Control, RLC, and Medium Access Control, MAC, layers to enable the wireless communication device to stop transmission of the corresponding lower-layer data units of the indicated higher-layer packets and remove the lower-layer data units from the transmission buffers associated with the second connection.

4. The method of claim 1, wherein the mapping is a mapping between PDCP, RLC, and MAC packets or data units.

5. The method of claim 1, wherein the method further comprises one or more of the following operations:
 receiving information from at least one of the network units requesting the wireless communication device to apply a rule of removing redundant packets; and
 sending information to at least one of the network units indicating that the wireless communication device applies the rule of removing redundant packets.

6. The method of claim 1, wherein the method comprises sending information to at least one of the network units indicating removed higher-layer packets corresponding to the removed lower-layer data units.

7. The method of claim 6, wherein information indicating removed higher-layer packets comprises a summary message comprising information indicating removed higher-layer packets from at least two occasions of removing redundant packets.

8. A wireless communication device configured for multi-connectivity to enable individual connections to at least first and second network units, wherein the wireless device comprises:
 communication circuitry; and
 a processor and a memory, the memory comprising instructions executable by the processor whereby the wireless communication device is configured to:

receive information indicating higher-layer packets received by the first network unit from the wireless communication device over a first one of the connections, and based on a mapping between higher-layer packets and lower-layer data units, as maintained by the wireless communication device, remove lower-layer data units corresponding to the indicated higher-layer packets from one or more transmission buffers associated with a second one of the connections.

9. The wireless communication device of claim 8, wherein higher-layer packets comprising the same information are transmitted over the first connection and the second connection as redundant packets.

10. The wireless communication device of claim 8, wherein the wireless communication device is configured to transfer the information, indicating the higher-layer packets received by the first network unit over the first connection, within the wireless communication device from the Packet Data Convergence Protocol, PDCP, layer to the Radio Link Control, RLC, and Medium Access Control, MAC, layers to enable the wireless communication device to stop transmission of the corresponding lower-layer data units of the indicated higher-layer packets and remove the lower-layer data units from the transmission buffers associated with the second connection.

11. The wireless communication device of claim 8, wherein the mapping is a mapping between PDCP, RLC, and MAC packets or data units.

12. The wireless communication device of claim 8, wherein the mapping is a mapping between PDCP packet sequence numbers, RLC packet sequence numbers and HARQ process identity numbers.

13. The wireless communication device of claim 8, wherein the wireless communication device is configured to perform one or more of the following operations: receive information from at least one the network units requesting the wireless communication device to apply a rule of removing redundant packets; and send information to at least one of the network units indicating that the wireless communication device applies a rule of removing redundant packets.

14. The wireless communication device of claim 13, wherein the wireless communication device is configured to receive and/or send the information by means of Radio Resource Control, RRC, signaling.

15. The wireless communication device of claim 8, wherein the wireless communication device is configured to send information to at least one of the network units indicating removed higher-layer packets corresponding to the removed lower-layer data units.

16. The wireless communication device of claim 15, wherein the wireless communication device is configured to send the information indicating removed higher-layer packets corresponding to the removed lower-layer data units in at least one Medium Access Control, MAC, control element.

17. The wireless communication device of claim 15, wherein information indicating removed higher-layer packets comprises a summary message comprising information indicating removed higher-layer packets from at least two occasions of removing redundant packets.

18. The wireless communication device of claims 8, wherein the wireless communication device comprises at least one processor and memory, the memory comprising instructions, which when executed by the at least one processor, cause the at least one processor to remove redundant packets.

19. The wireless communication device of claim 8, wherein the first and second connections are uplink connections to respective radio network units.

20. The wireless communication device of claim 8, wherein the wireless communication device is adapted for dual connectivity.

21. The wireless communication device of claim 8, wherein the first and second connections are based on different radio access technologies.

22. A non-transitory computer-readable medium on which is stored a computer program for operating, when executed by a processor, a wireless communication device adapted for multi-connectivity to enable individual connections to at least first and second network units, wherein the computer program comprises instructions, which when executed by the processor, cause the processor to:
    receive information indicating higher-layer packets received by the first network unit from the wireless communication device over a first one of the connections; and
    based on a mapping between higher-layer packets and lower-layer data units, as maintained by the wireless communication device, remove lower-layer data units corresponding to the indicated higher-layer packets from one or more transmission buffers associated with a second one of the connections.

23. An apparatus for handling redundant packet copies for a wireless communication device adapted for multi-connectivity and having individual connections to at least first and second network units, wherein the apparatus comprises circuitry configured to:
    receive information indicating higher-layer packets received by the first the network unit from the wireless communication device over a first one of the connections; and
    based on a mapping between higher-layer packets and lower-layer data units, as maintained by the wireless communication device, remove lower-layer data units corresponding to the indicated higher-layer packets from one or more transmission buffers associated with a second one of the connections.

* * * * *